United States Patent [19]
Shinmoto

[11] Patent Number: 5,116,554
[45] Date of Patent: May 26, 1992

[54] METHOD OF MAKING A FILM HAVING UNIFORM THICKNESS

[75] Inventor: Jitsumi Shinmoto, Tokyo, Japan

[73] Assignee: Tomi Machinery Manufacturing Co. Ltd., Japan

[21] Appl. No.: 425,756

[22] Filed: Oct. 23, 1989

[51] Int. Cl.$^5$ .................. B29C 47/92; B29C 55/28
[52] U.S. Cl. ................... 264/40.1; 73/864.41; 83/919; 264/10.6; 264/564
[58] Field of Search ........... 264/40.1, 40.2, 40.6, 264/148, 209.1, 564; 425/141, 144; 73/864.41; 356/381; 83/919

[56] References Cited

U.S. PATENT DOCUMENTS 3,761,553  9/1973  Richardson .................. 264/40.6
3,883,279  5/1975  Heyer ........................... 425/141

FOREIGN PATENT DOCUMENTS 58-29624   2/1983  Japan .
01-314135 12/1989  Japan .

Primary Examiner—Leo B. Tentoni
Attorney, Agent, or Firm—Ostrolenk, Faber, Gerb & Soffen

[57] ABSTRACT

A method of providing uniform thickness of a synthetic resin film upon molding of the synthetic resin film with a die having a plurality of heating elements arranged adjacent a die lip of the die. The thickness of a film molded by the die is measured by cutting a sample of the molded film in a direction perpendicular to the direction of drawing of the film, and measuring the thickness of the sample in the direction of cutting with a film thickness measuring device. The measured values are then fed to an arithmetic unit. At the arithmetic unit, a corresponding relationship is calculated, based on the measured film thickness values, between a one-sided material portion of the film and the plurality of heating elements, and amounts of heat to be generated by the corresponding heating elements are individually controlled in accordance with the relationship.

3 Claims, 5 Drawing Sheets

METHOD OF MAKING A FILM HAVING UNIFORM THICKNESS

BACKGROUND OF THE INVENTION

1. Field of the Invention

This invention relates to a synthetic resin film having a uniform thickness, a method of removing one-sided material to obtain a uniform thickness upon production of such film and an apparatus for carrying out the method.

2. Description of the Prior Art

Upon production of a film wherein molten resin is drawn out from a narrow lip of a film molding die into a thin film, a film produced somtimes becomes non-uniform in thickness.

To remove such one-sided material upon molding of a film of the molten material extruded type, there are two methods including a method of varying the distance of a lip to mechanically control the thickness of a film and the other method of varying the temperature distribution of a lip to thermally control the thickness of a film.

The method of mechanically adjusting the distance of a lip to remove one-sided material has a limitation in accuracy and requires much time in adjustment to lead low response.

While it is well know that one-sided material can be removed by varying the temperature distribution of a lip, neither method nor apparatus for quickly adjusting the temperature distribution of a lip in response to a degree of one-sided material of a film to remove the one-sided material has been put into practical use so far.

Factors which cause one-sided material in a process of production of a synthetic resin film are complicated, but are roughly divided into two types incuding a type wherein a dimension or a configuration of a mechanical structure is a parameter and another type wherein a temperature, a drawing speed, a speed of cooling wind or the like is a parameter.

It is difficult or impossible to remove one-sided material which is caused by a factor wherein an element of time such as a speed or a speed of wind is included as a parameter or wherein time is not directly included as a parameter but a temperature which changes momentarily is included as a parameter by changing the dimension or configuration of a film molding apparatus.

Meanwhile, upon production of a film by drawing out molding, drawing out of a film cannot be stopped even during adjustment of a film thickness or one-sided material, and a film portion which is produced during such adjusting period makes an unacceptable article. Accordingly, a time required for adjustment of one-sided material or a responding time of an adjusted parameter to a completed article should be minimized desirably.

Particularly, unless initialization upon starting of operation of a film producing machine is completed quickly so that a film of desired specifications can be produced in a short time, the yield will be low and the price of film products will be increased.

On the other hand, when various kinds of films are to be produced in small quantities, specifications of a film may be changed without stopping operation of a film producing machine. It is desired to attain such adjustment to remove one-sided material quickly by a simple operation so that products of desired specifications may be obtained rapidly.

Thus, while a conventional apparatus wherein a large number of heaters are provided around a lip of a film molding die to remove one-sided material is effective in principle to remove one-sided material, such large number of heaters must be controlled in a required manner in order to reform the one-sided material. Accordingly, it is expected for such means to be put into practical use.

SUMMARY OF THE INVENTION

It is an object of the present invention to provide a synthetic resin film which has a very uniform thickness.

It is another object of the present invention to provide a method of and an apparatus for uniforming the thickness of a synthetic resin film upon molding of the synthetic resin film wherein a plurality of heating means are individually controlled rapidly in a required manner to obtain a synthetic resin film of a uniform thickness.

In order to attain the objects, according to one aspect of the present invention, there is provided a synthetic resin film which is molded by drawing out molten resin from a die which includes a plurality of heating means on a circumferential edge of a die lip thereof, a thickness of a film after molding being measured along a direction perpendicular to the drawing out direction of the film while establishing a corresponding relationship between measurement positions and the film thickness, a corresponding relationship being established between the plurality of heating means and measured film thickness data while establishing a corresponding relationship between a particular position of the die lip and one of the measured film thickness data at a particular measurement position, electric control values for individually controlling heat generation of the heating means so that the measured film thickness data may be equal to each other being calculated based on the measured film thickness data individually corresponding to the heating means, molten resin being drawn out from the die wherein the heating means are individually controlled with the obtained electric control values to mold the synthetic resin film.

The synthetic resin thus has a uniform thickness with little one-sided material.

According to another aspect of the present invention, there is provided a method of uniforming the thickness of a synthetic resin film upon molding of the synthetic resin film, which comprises the steps of drawing out molten resin from a die which includes a plurality of heating means on a circumferential edge of a die lip thereof to mold a film, measuring a thickness of the film after molding in a direction perpendicular to the drawing-out direction of the film while establishing a corresponding relationship between the film thickness and measurement positions, establishing a corresponding relationship between measured film thickness data and the plurality of heating means while establishing a corresponding relationship between a particular position of the die lip and one of the measurement positions, calculating, based on the measured film thickness data individually corresponding to the heating means, electric control values for controlling heat to be individually generated by the heating means so that the measured film thickness data may be equal to each other, and controlling amounts of heat to be individually generated by the heating means in accordance with the electric control values individually calculated for the heating means.

According to a further aspect of the present invention, there is provided an apparatus for uniforming the thickness of a synthetic resin film upon molding of the synthetic resin film, which comprises a film molding die including a plurality of heating means adjacent a die lip thereof, a film drawing-out means for drawing out, at a particular speed, molten resin discharged from the die lip, a film thickness measuring means for measuring a thickness of the film after molding along a direction perpendicular to the drawing-out direction of the film to be measured while establishing a corresponding relationship between measurement positoins and the film thickness to obtain measured film thickness data, a calculating means for establishing, based on the film thickness data measured by the film thickness measuring means, a corresponding relationship between the film thickness data and the plurality of heating means while establishing a corresponding relationship between position data of the film thickness data and a circumferential edge of the die lip and for calculating, based on the film thickness data individually corresponding to the heating means, electric control values for electrically controlling amounts of heat to be individually generated by the heating means so that the thickness of the film may be uniform, and a heat generation controlling means for controlling amounts of heat to be individually generated by the heating means in accordance with the electric control values calculated by the calculating means individually corresponding to the heating means.

A thickness of a film completed is measured by the film thickiness measuring means, and measured values are taken into the calculating means. At the calculating means, a corresponding relationship is calculated, based on the measured film thickness values, between a one-sided material portion of the film and the heating means adjacent the die lip, and amounts of heat to be generated by the corresponding heating means are controlled in accordance with amounts of one sided material at the one sided material portion of the film.

With the method and apparatus, adjustment for removal of one-sided material is performed rapidly, and accordingly, unacceptable products which may possibly be molded during such adjustment are reduced in number, which improves the yield.

A change in specification of a film can be coped with rapidly. Consequently, films of many types can be readily produced in a small quantity, and no much skill is required for adjustment of a thickness of a film.

The above and other objects, features and advantages of the present invention will become apparent fromt he following description taken in conjuction with the accompanying drawings.

DETAILED DESCRIPTION OF THE PREFERRED EMBODIMENTS

Figure 1:
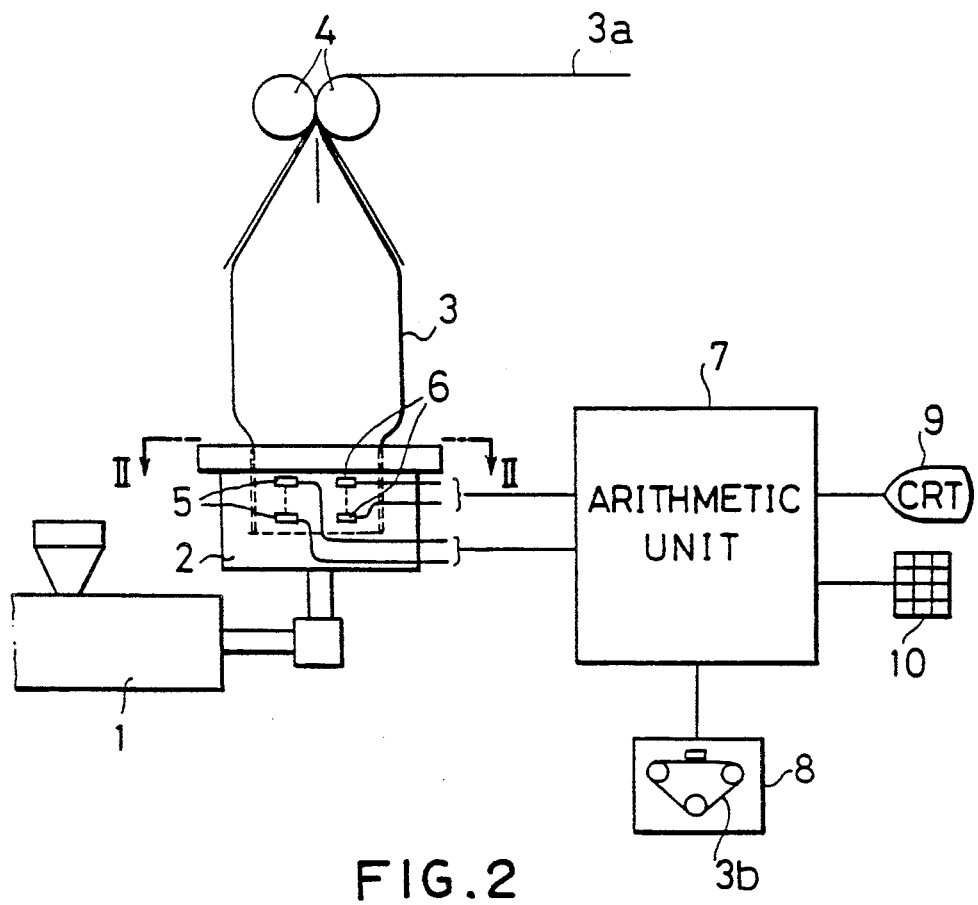
FIG. 1 is a block diagram of an embodiment wherein the present invention is applied to an inflation film molding apparatus.

FIG. 1 shows an embodiment wherein the present invention is applied to a film molding apparatus of the molten material extruding type such as an inflation film molding apparatus. Referring to FIG. 1, the inflation film molding apparatus shown includes an extruding machine 1 and has a film molding die 2 from which a film 3 is to be drawn out. The inflation film molding apparatus further includes a pair of nip rolls 4 for drawing out such film 3 from the film molding die 2.

The inflation film molding apparatus further includes a plurality of heating elements 5 provided adjacent to a periphery of a die lip 2a of the die 2, and a plurality of temperature measuring elements 6 disposed adjacent to some of the heating elements 5 for measuring the temperatures around them.

The inflation film molding apparatus further includes an arithmetic unit 7 for controlling an amount of heat to be generated by each of the heating elements 5 in a required manner. Several peripheral devices are provided for the arithmetic unit 7, including a film thickness measuring device 8 for measuring a thickness of a completed film 3a folded in a flattened condition by the nip rolls 4 after the film 3 is cooled to a required temperature and for delivering data of such measurement to the arithmetic unit 7, a CRT (cathode ray tube) monitor device 9 for displaying thereon required data from the arithmetic unit 7 and required instructions, and a key device 10 for entering therethrough a function code, numerical data and so forth.

The heatin elements 5 are individually controlled to generate required amounts of heat and may be, for example, electric heaters of the ceramic sheath type. The heating elements 5 are disposed in a spaced relationship by a small distance on the outer periphery of the annular die lip 2a.

Figure 2:
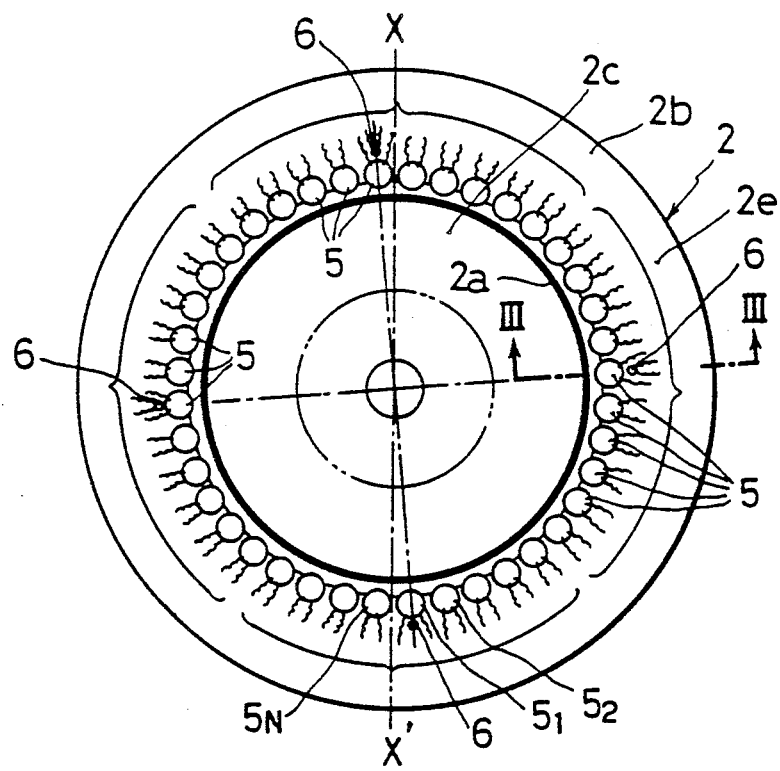
FIG. 2 is an enlarged plan view of a die as viewed along line II—II of FIG. 1.

The temperature measuring elements 6 are disposed adjacent to particular ones of the heating elements 5 for measuring the temperature around the particular heating elements 5 at an absolute level. In particular, in the embodiment shown, up to four such temperature measuring elements 6 are disposed in an equidistantly spaced relationship as seen in FIG. 2 such that they may measure the temperatures of the heating elements 5 nearest to the temperature measuring elements 6 and also measure the reprsentative temperatures of the four equally divided groups of the heating elements 5.

Molten resin material is drawn out from the die 2 having the plurality of heating elements 5 provided on the peripheral edge of the die lip 2a thereof to form a film 3 while the thickness of the film 3 is measured along a line perpendicular to the film drawing-out direction at a measuring position by way of the film thickness measuring device 8. Measured values of the film thickness measuring device 8 are delivered to the arithmetic unit 7.

The arithmetic unit 7 establishes a corresponding relationship between the plurality of heating elements 5 provided on the circumferential edge of the die lip 2a and the measured film thickness data while the measurement positions from which the measured film thickness data are derived are caused to correspond to various positions of the die lip 2a. The arithmetic unit 7 further calculates electric control values for controlling the individual heating elements 5 based on the thickness film thickness data corresponding to the individual heating elements 5 such that the measured film thickness data may be equal to each other.

As molten resin material is drawn out from the die 2 wherein the individual heating elements 5 are controlled with the electric control values calculated in this manner, a synthetic resin film according to the present invention can be produced which is uniform in thickness.

Figure 3:
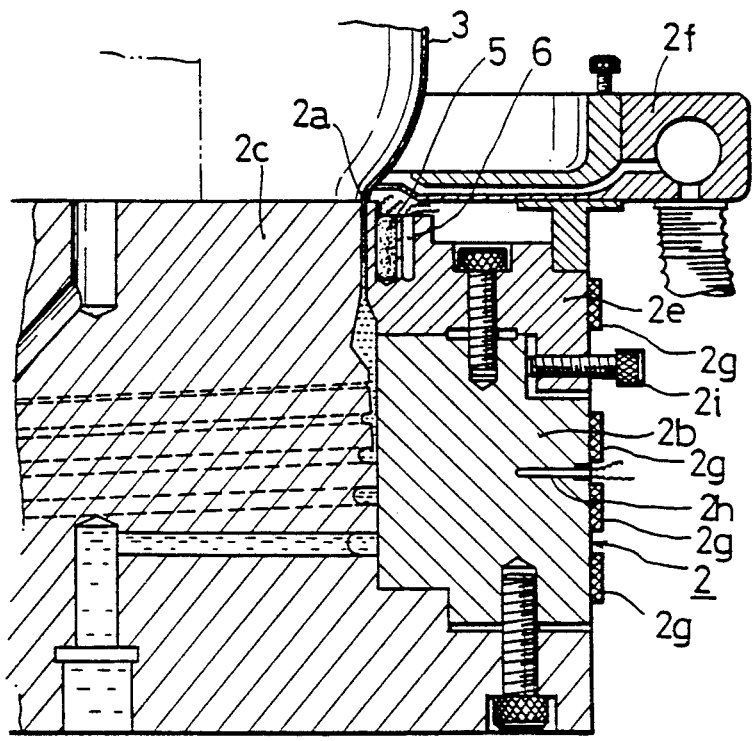
FIG. 3 is an enlarged vertical sectional view taken along line III—III of FIG. 2.

Referring now to FIG. 3, the die 2 is shown in vertical section wherein a heating element 5 and a temperature measuring element 6 are disposed adjacent the die lip 2a. A mandrel 2c is fitted at the center of the die body 2b, and a lip adjusting ring 2e is fitted around an outer periphery of an upper end portion 2d of the mandrel 2c with a gap left therebetween which serves as the die lip 2a. An air ring 2f for cooling a film 3 (which is called, in the case of inflation molding, bubble) drawn out from the die lip 2a with air is located above the lip adjusting ring 2e.

It is to be noted that, while an inside mandrel for generating an internal pressure of such a bubble as described above, a bubble guide for guiding an outer periphery of a bubble and some other components are provided in the inflation film molding apparatus, they are not shown in FIG. 3 because they have no relation with operation of the present invention.

Three band heaters 2g are wound around an outer periphery of the die body 2b and a band heater 2g is would around an outer periphery of the rip adjusting ring 2e. The temperature of the die 2 is measured by a temperature measuring elements 2h provided in the die body 2b and is thus controlled in a required manner.

The lip adjusting ring 2e is centered with the mandrel 2c by means of an adjusting screw 2i such that the distance of the die lip 2a may be uniform over the entire circumference of the die lip 2a.

Each of the heating elements 5 is embedded in the lip adjusting ring 2e adjusting to the die lip 2a and extends in an axial direction of the die 2.

Each of the temperature elements 6 adjacent to a corresponding one of the heating elements 5 is embedded in the lip adjusting ring 2e. The temperature elements 6 may be of thermocoupled platinum resistor or other temperature sensing types. In the embodiment shown, a thermocouple is employed for each of the temperature elements 6.

The inflation film molding apparatus of the embodiment shown includes four temperature elements because the heating elements 5 which comprises electric heaters are suitable for power control to make proportional control of the amounts of heat generated by the electric heaters. However, it is not essential in the proportional control to know temperatures of the heating elements 5 as hereinafter described.

However, if the temperature of the die lip are known, then some other factors which cause one-sided material making a temperature as a parameter can be compensated for in temperature as time passes, and accordingly, up to four temperature measuring elements 6 are provided in the inflation film molding apparatus.

According to the present invention, the amount of heat to be generated by each of the heating elements 5 can be controlled in response to a temperature, and to this end, a temperature measuring element may be provided for each of the heating elements 5.

Control of an amount of generated heat by control of temperatures of electric heaters is generally higher in response than control of an amount of generated heat by proportional control of the power of electric heaters because the former makes feedback control.

Control and response of the heating elements 5 in the present inventrion will be hereinafter described.

Figure 4:
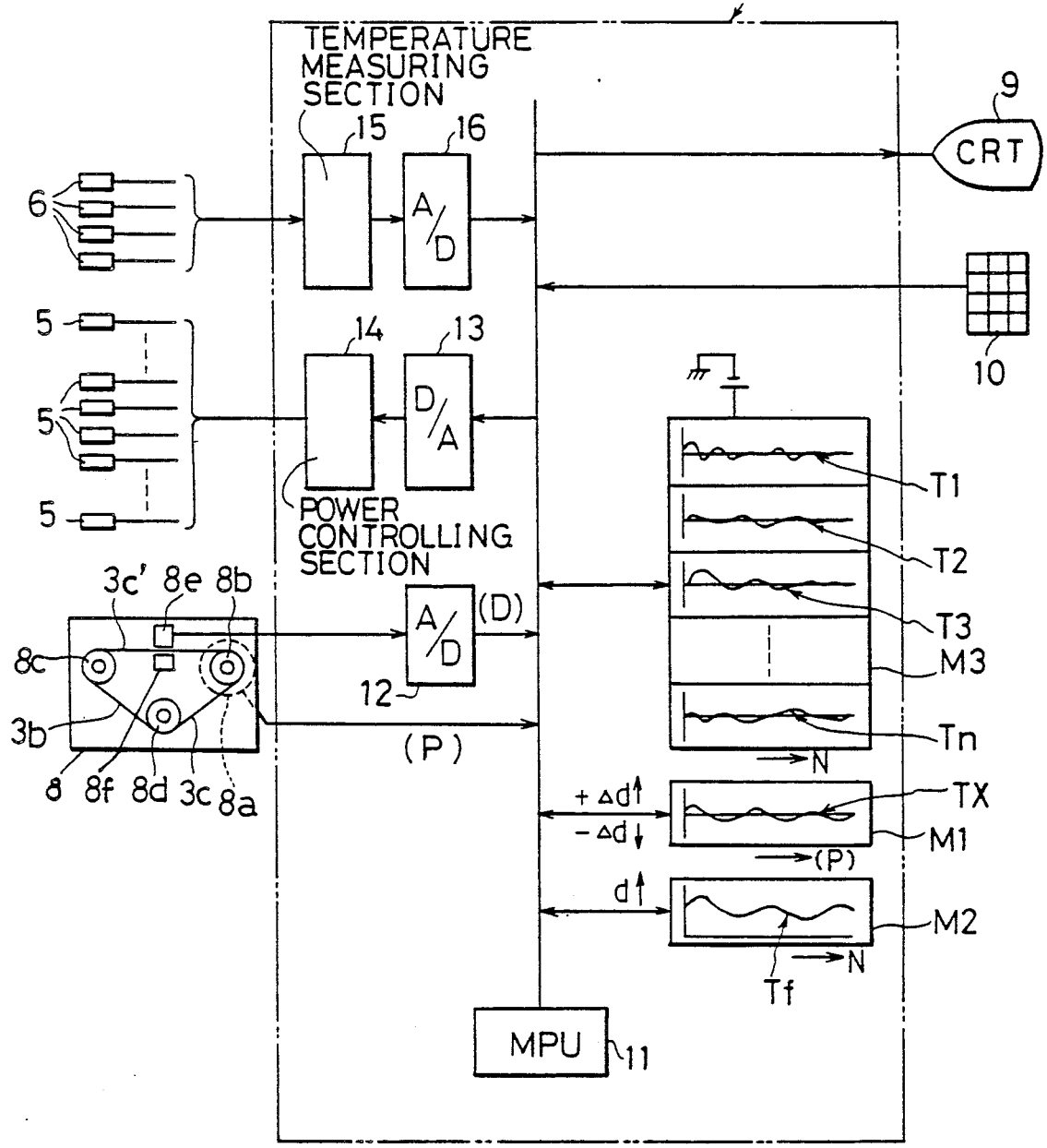
FIG. 4 is a block diagram of an arithmetic unit shown in FIG. 1.

Referring now to FIG. 4, the arithmetic unit 7 is a microcomputer which comprises a microprocessor unit 11 (hereinafter referred to as MPU).

The film thickness measuring device 8 measures a thickness of a sample film 3b in the form of an annular belt which is formed by cutting a complete film 3a for each suitable length (10 to 20 mm or so) in a direction perpendicular to the film drawing-out direction successively in the direction perpendicular to the drawing-out direction of the film 3, that is, along a cut end of the sample film 3b.

In particular, the film thickness measuring device 8 successively measures a thickness of the sample film 3b in the form of an annular belt while feeding the sample film 3b along the cut end thereof and delivers measured film thickness data to the arithmetic unit 7 while maintaining a corresponding relationship between the measured film thickness data and data of positions of measurement in the feeding direction (i.e., in the direction perpendicular to the film drawing-out direction).

The film thickness measuring device 8 includes an annular tape feeding means including a drive roller 8b having a rotary encoder 8a provided thereon, a guide roller 8c and a tension roller 8d. A sample film 3b is thus stretched on and fed along the cut end thereof by the tape feeding means, and data P of positions of measurement in the feeding direction are detected by means of the rotary encoder 8a.

A film thickness detecting sensor 8e and a light projector 8f are provided between the drive roller 8b and the guide roller 8c. The film thickness detecting sensor 8e successively measures a thickness of the sample film 3d being fed, and where the output of the film thickness detecting sensor 8e is an analog value, it is converted into a digital film thickness data D by way of an analog to digital converter 12.

Position data P and film thickness data D are taken into the MPU 11 and stored into a working memory M1 either as data of a one-dimensional array in the form of table wherein the position data P correspond to addresses or as data of a two-dimensional array wherein the position data P and the film thickness data are paired with each other and correspond to separately provided continuous addresses.

Since the position data P of a sample film 3b in the form of an annular belt are circulated infinitely, a reference point is set in advance to delineate a starting point and a stopping point of position data.

If a fold 3c of a film 3 which is formed when the film 3 is folded by the nip rolls 4 is caused to correspond an opening portion of the die lip 2a, then the portion of the fold 3c always correspond to a fixed position.

In particcular, if contact faces of the nip rolls 4 are projected on the die 2 below, then they make a line corresponding to a line X—X' shown in FIG. 2, and each point at which the line X—X' crosses the die lip 2a corresponds to a position from which a fold 3c is drawn out.

Such folds 3c remain also on each sample film 3b, and either of the folds 3c is defined as a reference point.

When a sample film 3b is sampled, a mark is applied to one of the folds 3c, for example, to a fold 3c on the X' side setting the X' side fold 3c as a reference point, and different marks such as arrows are applied to front and rear portions of the film 3 in the drawing-out direction so that such front and rear portions may be seen later.

With such a sample film 3b as described above, position data P of the sample film 3b can be delineated as required position data P while a fold 3c' to which the mark of a reference point is applied is circulated one round.

In the position data P obtained in such a manner as described above, starting and stopping points of the position data P correspond to a fold 3c', and consequently, the position data P correspond to the circumferential edge of the opening of the die lip 2a and also have a one-by-one corresponding relationship to the individual heating elements 5 provided adjacent to the die lip 2a.

Figure 5:
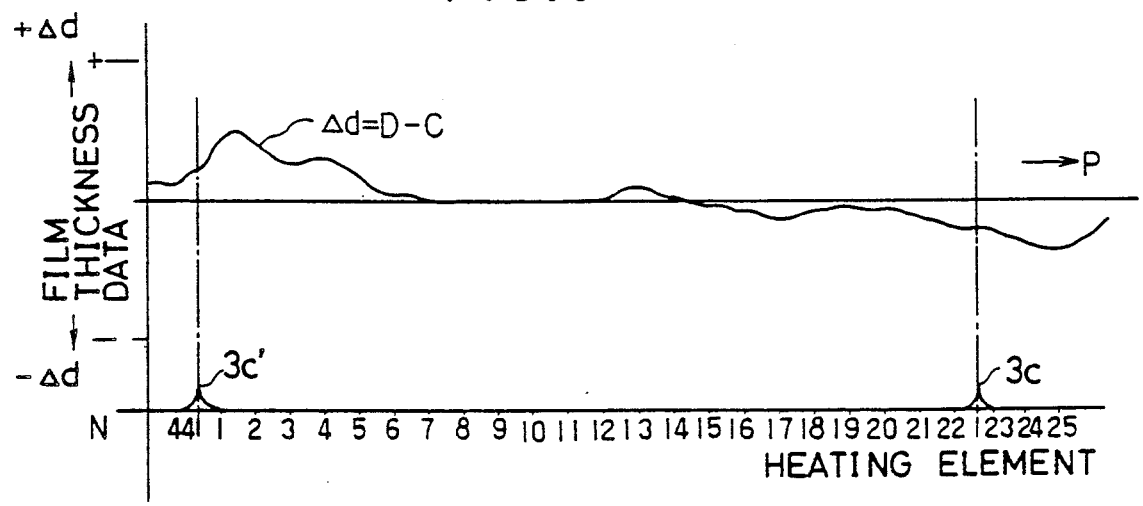
FIG. 5 is a graph showing data of film thickness corresponding to position data of a sample film and also to positions of individual heating elements provided along a peripheral edge of a lip opening of a die.

FIG. 5 shows a relationship of positions of the fold 3c and individual heating elements 5 to position data D of a sample film 3b and film thickness data D corresponding to the position data.

It is to be noted that the individual heating elements 5 are numbered with element numbers N counterclockwise beginning with a heating element 5 at a reference point X' from which the fold 3c' to which the mark is applied is drawn out.

As seen FIG. 5, the measured film thickness data D correspond to the individual heating elements 5 having such element numbers N applied thereto, and therefore, electric values of the individual heating elements 5 required to remove one-sided material can be calculated form such data.

For example, each of the film thickness dat D is compared in magnitude with a reference film thicness value (hereinafter referred to a preset value) of film specifications required for a complete film 3a to find out a deviation.

Thus, it can be seen that, each of those heating elements 5 corresponding to film thickness data D which coincide with the preset value, for example, the seventh to twelfth heating elements 5 in FIG. 5, should remain under the current control condition.

When a film thickness data D is greater than the preset value, each of thoses heating element 5 which correspond to a portion of the complete film 3a which is greater in thickness than the present value, for example, each of the first to sixth heating elements 5, should be increased in amount of heat to be generated thereby to raise the temperature at locations of the die lip 2a around the heating elements 5 to decrease the thickness of film upon molding of the film.

The heating value of each heating element 5 increases in proportion to a deviation of the film thickness data D corresponding to the heating element 5 from the preset value.

To the contrary, when a film thickness data D is smaller than the preset value, each of those heating element 5 which corresponding to a portion of the complete film 3a which is smaller in thickness than the preset value, for example, each of the 15th to 25th heating elements 5, should be decreased in amount of heat to be generated thereby to lower the temperatures at locations of the die lip 2a around the heating elements 5 to increase the thickness of a film upon molding of the film.

Also in this instance, the heating value of each heating element 5 decreases in proportion to a deviation of the film thickness data D corresponing to the heating element 5 from the preset value, similarly as in the case of increase in heating value.

It is to be noted that, since a deviation from the preset value assumes either a positive or a negative value, it can be commonly said that a control change amount of a heating element 5 is proportional to a difference between a film thickness data D corresponding to the heating element 5 and the preset film thickness value.

Consequently, an amount of change of control of each heating element 5 required to remove one-sided material is provided not based on an absolute level but based on a relative level.

In particular, irrespective of an amount of heat generated by each heating element 5 when a sample film 3b is molded (the time will be hereinafter referred to as the present time), for example, where each of the heating elements 5 is an electric heater, irrespective of to what degree the present power consumption is actually, an amount of heat to be generated is found out as a power value to be added to or subtracted from a present value of power consumption.

In controlling power in an electric heater, when the temperature coefficient of resistance in the electric heater is zero or very small, power consumption or an amount of generated heat increases in accurate proportion to a square value of electric current or voltage, and accordingly, proportional control can be made readily and no temperature compensation is required. Incidentally, the temperature coefficient of a nichrome wire is very small.

Thus, an increase/decrease data $\Delta d$ of heat generation by each heat element 5 is determined from a preset value C corresponding to a reference film thickness, position data D and film thickness data D by calculation of an equation $\Delta d = D - C$ for each position data D by the MPU 11.

A table wherein the position data D and the increase/decrease data $\Delta d$ corresponds to each other is made by the MPU 11, and from the table, another heating element control table Tx is made wherein the element numbers N applied to the individual heating elements 5 correspond to the position data D and the element numbers N corresponds to the increase/decrease data $\Delta d$. The control table Tx is stored once into the working memory M1.

The arithmetic unit 7 includes a memory area which comprises a nonvolatile memory M2 such as a ROM or a RAM which is backed up by a battery, the memory M2 containing a heating element reference control table Tf.

The reference control table Tf contains data which are used to remove one-sided material components which are caused by perculiar characteristics of the die 2 which are determined upon production of the die or upon adjustment of the distance of the die lip 2a such as a fluctuation of the distance of the gap of the die lip 2a or dispersion of the heat generating characteristic of the individual heating elements.

For example, upon initial adjustment during test working, the individual heating elements 5 are controlled to generate heat at a fixed value proximate the center of a range of control while film specifications and a running condition are set to standard conditions to mold a film 3, and the aforementioned control table Tx is made depending upon measured data of a sample film 3b obtained upon such molding.

Subsequently, control values of the individual heating elements 5 are changed in accordance with the control table Tx. In particular, an increase/decrease data Δd corresponding to each heating element is added to an initial fixed reference value of the heating element.

After control of each heating element 5 is modified to change an amount of heat to be generated by the heating element 5, when the heating elements 5 for which control has been changed reach a thermal equilibrium, a next sample film 3b is collected.

Thereafter, such adjustment is repeated in a similar manner until a sample film 3b no more has one-sided material or a one-sided material component is reduced to a value within a predetermined reference range.

Such repetitive adjustment based on collection of a sampling film 3b is substantially feedback control in automatic control. An increase/decrease data Δd corresponds to the feedback amount in such feedback control, and if the feedback amount is in the negative, that is, if the feedback amount acts in a direction in which one-sided material is removed, then a one-sided material component converges to zero after a long period of time.

At a point of time when one-sided material is removed as a result of such adjustment as described above and a film 3a having a uniform thickness is obtained, the control table Tx then is determined as a control reference table Tf and stored into the nonvolatile memory M2.

It is to be noted that portions of the control reference table Tf relating to control data d of the individual heating element 5 may be either of relative values to reference values similarly to the increase/decrease data Δd and values of an absolute level corresponding to amounts of heat generated (or power consumption) by the individual heating elements 5.

Production of the reference control table Tf may be performed upon assembly of the die 2 or upon adjustment of the lip distance of the die lip 2a.

When normal molding of a film is started, the individual heating elements 5 are controlled at first in accordance with the reference control table Tf. However, parameters which cause one-sided material are great in number and complicated because the temperature is involved. Further, when a film of different specifications from those upon production of the reference control table Tf is produced, one-sided material sometimes takes place.

Accordingly, upon starting of molding of a film, after the die 2 is preheated in accordance with the reference control table Tf until a thermal equilibrium condition is reached and then a condition is reached wherein a film 3 can be molded stably, molding of a film is started, and a sample film 3b is extracted. The sample film 3b is loaded in position on the film thickness measuring device 8 to measure a thickness thereof to collect position data P and film thickness data D.

Variations of the reference control table Tf are calculated from the position data P and the film thickness data D, and amounts of heat to be generated by the individual heating elements 5 are re-set rapidly.

Heating element numbers N calculated by the MPU 11 and corresponding control data d are transmitted by way of a digital to analog (hereinafter referred to briefly as D/A) converting section 13 and a power controlling section 14 to control the individual heating elements 5.

Meanwhile, measured values of the individual temperature measuring elements 6 are taken at a suitable point of time into the MPU 11 by way of a temperature measuring section 15 and an analog to digital (hereinafter referred to briefly as A/D) converting section 16.

Figure 6:
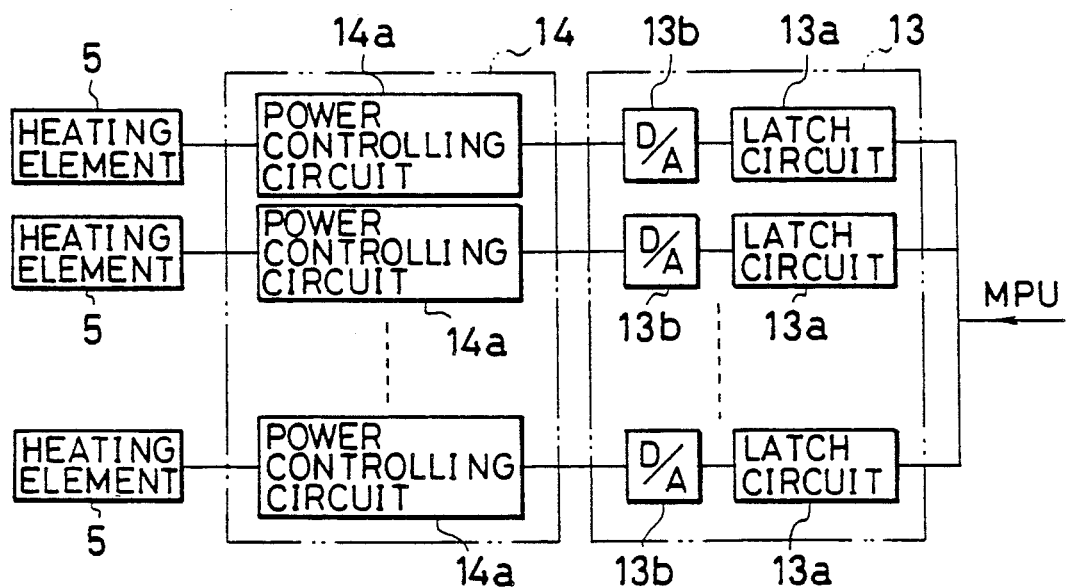
FIG. 6 is a block diagram showing an embodiment of a power controlling section shown in FIG. 4.
Figure 7:
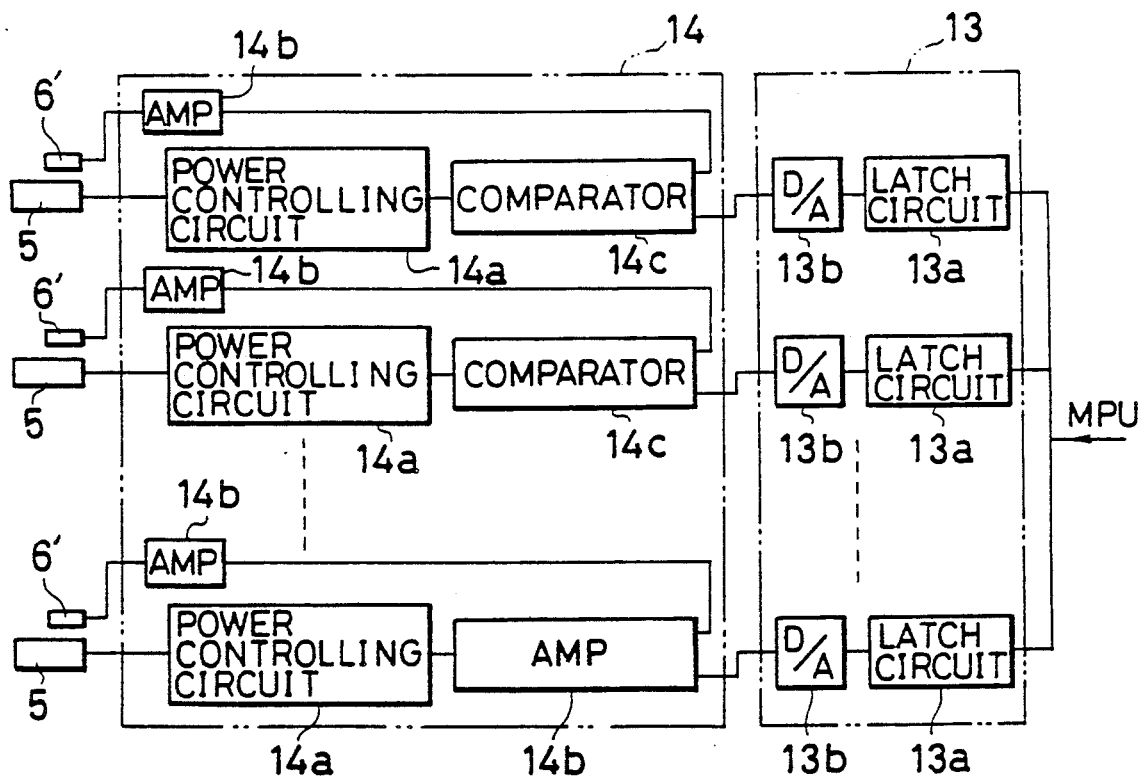
FIG. 7 is a block diagram showing another embodiment of the power controlling section shown in FIG. 4.

FIG. 6 shows an exemplary circuit for power controlling electric heaters of the individual heating elements 5 in accordance with proportional control, and FIG. 7 shows an exemplary circuit for feedback controlling the individual heating elements 5 by way of individually paired temperature measuring elements 6'.

Referring first to FIG. 6, a power controlling section 14 includes a plurality of power controlling circuits 14a for individually controlling power consumption of the heating elements 5.

Each of the power controlling circuits 14a controls power consumption of a load at an output thereof in response to a value of an input voltage. Thus, if the input voltage is fixed, then the power consumption of the load at the output of the power controlling circuit 14a is fixed, but if the input voltage varies, then the output power varies in proportion to a magnitude of the input voltage.

Each of such power controlling circuits 14a can be attained with a circuit which squares an input voltage thereto where an electric heater used as a load has a temperature coefficient of resistance which is very small or substantially equal to zero, as described hereinabove.

Meanwhile, power control can be attained even by time-shared control employing a thyristor. Correspondence linearity between the control data d and power consumption in this instance can be coped with by calculation by the MPU 11. Such linearity, however, is not essential to the present invention.

In the present embodiment, proportional control which depends upon the former squaring circuit or wherein control data d are squared in advance on the MPU 11 side and then delivered to the power controlling circuits 14a will be described.

Control data d (or squared values $d^2$ of control data d) are delivered from the MPU 11 to the D/A converting section 13. The control data d are latched into latch circuits 13a of circuits which are provided for controlling the heating elements 5 of the heating element numbers N corresponding to the control data d.

The thus latched control data d are then delivered from the latch circuits 13a to D/A converting circuits 13b at which they are converted from digital values into analog values, and the thus D/A converted circuits 14a.

Such construction of the D/A converting section 13 as described above is only an example, and the D/A converting section 13 may otherwise include sampling and holding circuits which hold analog signals after conversion from digital to analog values. In this instance, analog signals after conversion from digital signals can be distributed to the sampling and holding circuits corresponding to the numbers N by means of a multiplexer which includes analog switches or the like.

Each of the latch circuits 13a may designate a heating element number N in accordance with a port address from the MPU 11 so that it may directly take in control data d over a bus line of the MPU 11.

FIG. 7 shows another embodiment of the power controlling section 14 wherein the power controlling circuits 14a are similar to those in FIG. 6.

Temperature measuring elements 6' are provided in one-by-one corresponding relationship to the heating elements 5 and measure temperatures of the corresponding heating elements 5.

A temperture detected by each of the temperature measuring elements 6 is converted into a temperature signal by way of an amplifier 14b and received by a control input terminal of a comparator 14c.

A D/A converting circuit 13b similar to that described hereinabove is connected to a reference signal input terminal of each of the comparators 14c. Thus, each of the comparators 14c controls the power controlling circuits 14a so that the temperature signal developed from the amplifier 14b may be equal to a control data "d" developed from the D/A converting circuit 13b.

Since each of the power controlling circuits 14a of FIG. 7 is controlled by an output of the comparator 14c, if the control data d is changed to a new value, then the output of the power controlling circuit 14a is varied widely to raise the response so that the heating element 5 is rapidly controlled to a temperature in accordance with the control data d.

With each of the power controlling circuits 14a shown in FIG. 6, if the control data "d" is changed to a new value, then an amount of change of an output voltage is only equal to a magnitude of the increase/decrease data $\Delta d$. Therefore, the response is low.

In order to eliminate this, upon changing of the control data d, a differentiation waveform component which is great in magnitude upon rising in accordance with a magnitude of the increase/decrease data $\Delta d$ and has a required attenuation factor may be overlapped in calculation by the MPU 11 to raise the response.

Meanwhile, the accuracy in absolute level of temperature signals obtained by the temperature measuring elements 6' of FIG. 7 by way of the amplifier circuits 14b, this is, the coincidence accuracy of mutual reference levels, may be lower than those which relate to common temperature control.

For example, an offset error of several degrees is permitted in relative errors of detection temperature characteristics by the temperature measuring elements 6' corresponding to the individual heating elements 5.

In particular, an increase/decrease data $\Delta d$ for removing a one-sided material component produced on a sample film 3b is a relative temperature difference component which is to be added to or subtacted from a temperature detected when the sample film 3b was made, and an absolute level error of a detected temperature upon extraction of the sample does not have an influence on the control.

This similarly applies to the power controlling circuits 14a shown in FIG. 6, and matching in absolute level of input/output characteristics among the individual power controlling circuits 14a is not required.

However, upon extraction of the first sample, an influence of dispersion of input/output characteristics of the individual power controlling circuits 14a of FIG. 6 or individual detection temperature characteristics of FIG. 7 is had.

In particular, even if the individual D/A converting circuits 13b all output a same value as reference values, dispersion in amount of heat generated by the individual heating elements 5 is caused by dispersion of the input-/output characteristics or the detection temperature characteristics described above, and this will have an influence on a one-side material component of the first sample film 3b.

In case the amounts of heat generated by the heating elements are changed, time is required until the heating elements 5 reach a thermally equilibrium condition with the changed amounts of generated heat. The time is response time, and in order to reduce the response time, such differentiation control or feedback control as decribed above is required.

However, the die lip 2a has a great heat capacity, and accordingly, even if the control described above is executed, a little time is still required until a stabilized condition is reached.

The time after changing of the amounts of heat to be generated until a thermally stabilized period is reached increases in proportion to a degree of change of the amounts of generated heat. In particular, the time has a proportional relationship to a magnitude of an absolute value $|\Delta d|$ of an increase/decrease data $\Delta d$, and if the increase/decrease data $\Delta d$ disperse widely and some of varying values have large values, then much time is required for adjustment for removal of one-sided material.

The heating reference control table Tf contains components for removing dispersion of input/output characteristics or of detection temperature characteristics, and at an initial stage of starting of normal molding of a film, the individual heating elements 5 are controlled in accordance with the control table Tf. Then, after the die 2 has been preheated sufficiently until it is thermally stablized, molding of a film is started.

After then, by adjustment based on first extraction of a sample after starting of normal operation, a film of a high quality having little one-sided material is produced rapidly.

Upon daily production of films, various data including data of a film thickness, a film width and a drawing out speed of a film are inputted to the MPU 11 by way of the key device 10.

After a film of a high quality is produced stably after adjustment for removal of one-sided material, a sample film 3b of the film is collected for confirmation as occasion calls, and the control data "d" of the individual heating elements 5 are caused to correspond to the heating element numbers N and stored into a nonvolatile M3 as a control table T1 conforming to film specifications.

Further, each time the film specifications are changed, control data then are stored as a control table T2, T3 or the like, and even if the film specifications are the same, the control data are updated to latest ones.

The control tables T1, T2, . . . confirming to the various film specifications are selected in accordance with data of film specifications which are inputted to the MPU 11 at an initial stage of operatioin, and upon starting of operation, the individual heating elements are controlled by the selected control table in place of the heating element reference control table Tf.

As a result, the thickness of a film can be controlled in accordance with specifications of the film and a latest control table T1, T2, . . . or Tn. The nonvolatile memory M3 for storing such control tables T1, T2, . . . and Tn therein may be IC (integrated circuit) card which can be removably loaded into the apparatus. Where an IC card is employed, a single control table may be stored in an IC card, or else a plurality of control tables may be stored in an IC card such that they may be related to particular factors such as film specifications or special specifications of purchasers.

OTHER EMBODIMENTS

Figure 8:
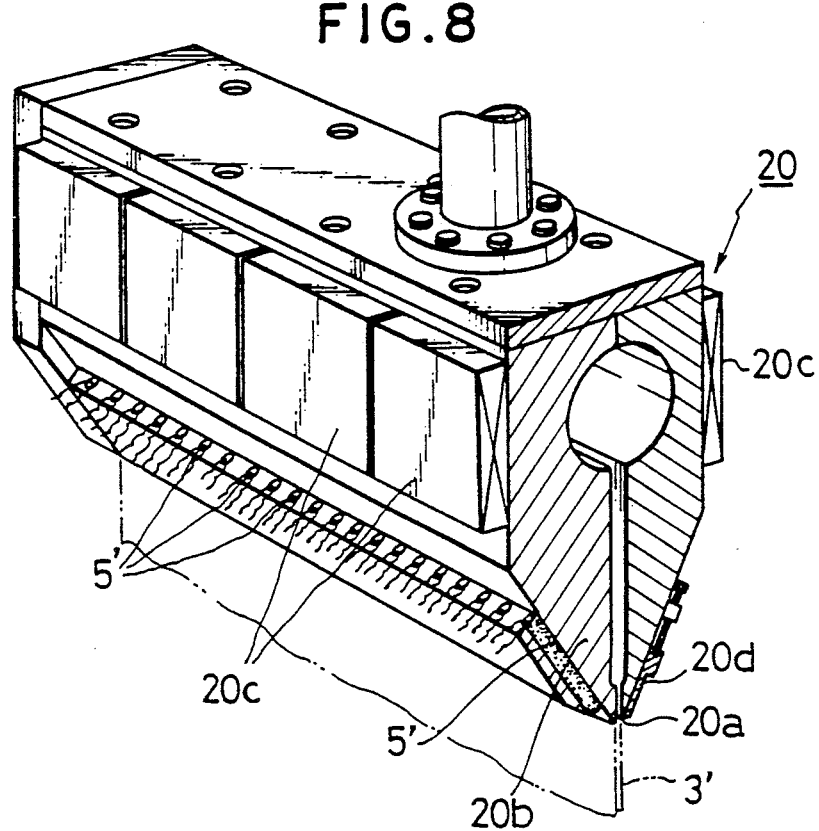
FIG. 8 is a perspective view, partly broken, of a T die showing another embodiment of a film molding die.

FIG. 8 shows another embodiment of film molding means. A film molding die 20 is of the type normally called T die wherein a die lip 20a presents a linear configuration so that a film 3' molded thereby may present a sheet-like configuration.

The film molding die 20 further includes a die body 20b, a plurality of heaters 20c and a lip adjusting plate 20d.

A large number of heating elements 5' are embedded in a side wall of the die body 20b opposite to the side wall on which the lip adjusting plate 20d is provided with respect to the die lip 20b.

The amounts of heat to be generated by the heating elements 5' are controlled in a similar manner as in the heating elements 5 described hereinabove.

Figure 9:
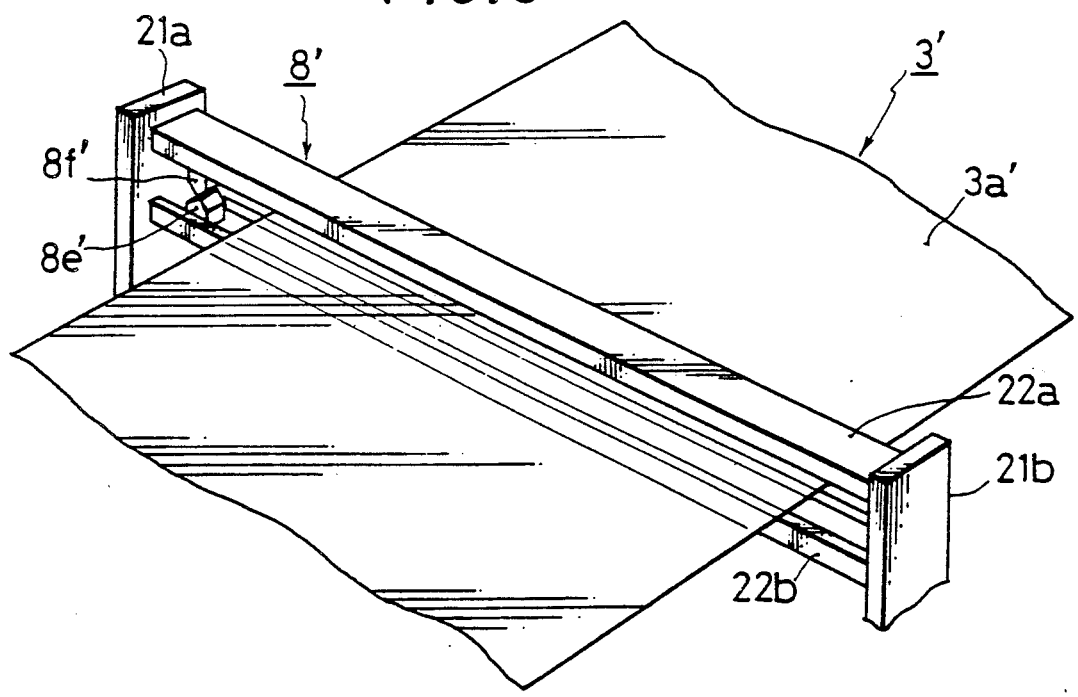
FIG. 9 is a perspective view showing another embodiment of a film thickness measuring device.

FIG. 9 shows another embodiment of a film thickness measuring device 8' which is suitable to measure a thickness of a sheet-like film 3' produced by the T die of FIG. 8.

The film thickness measuring device 8' is provided intermediately of a transport path of a complete film 3a' which is drawn out from the die 20 and cooled to a predetermined temperature.

The film thickness measuring device 8' includes a pair of support posts 21a and 21b located adjacent the opposite ends of a complete film 3a' in a widthwise direction perpendicular to the feeding direction of the complete film 3a', and a pair of guide rails 22a and 22b extending between the support posts 21a and 21b with the complete film 3a' held therebetween.

A film thickness detecting sensor 8e' and a light projector 8f' are mounted for longitudinal movement along inner opposing portions of the guide rails 22a and 22b.

The film thickness detecting sensor 8e' and the light projector 8f' are moved while they are held in a mutually opposing condition and the complete film 3a' is held between them, and the current position of them on the guide rails 22a and 22b is measured on a digital basis and taken into the arithmetic unit 7.

The measured film thickness data of the film thickness sensor 8e' are taken in the direction perpendicular to the feeding direction or drawing-out direction of the complete film 3a', and film thickness data similar to those illustrated in FIG. 5 are obtained in a corresponding relationship to positions of the film thickness sensor 8e'.

It is possible to establish a corresponding relationship between feeding positions of the film thickness sensor 8e' and the heating elements 5' provided adjacent to the die lip 2a, and accordingly, the heating elements 5' are individually controlled by such processing as described above.

Where the present invention is applied to the T die, since there is no necessity of collecting a sample film 3b as described above, continuous control is enabled, and the quality of products is further improved.

Further, it is also possible to effect photoelectric scanning, using a photoelectric optical sensor such as a CCD (charge coupled device) linear sensor and a widely elongated light source for the film thickness measuring device 8', in a direction perpendicular to the feeding direction of a film 3' and measure a light transmission factor of the film 3' at each scanning point to measure the film thickness.

In this instance, the thickness of the film 3' can be measured without contacting with the film 3', and even if the feeding speed of the film 3' is high, film thickness data along a line accurately perpendicular to the feeding direction of the film can be obtained because the moving speed of the CCD linear sensor is sufficiently high.

Having not fully described the invention, it will be apparent to one of ordinary skill in the art that many changes and modifications can be made thereto without departing from the spirit and scope of the invention as set forth herein.

What is claimed is:

1. A method of providing uniform thickness of a synthetic resin film upon inflation molding of the synthetic resin film, comprising the steps of:
    drawing out molten resin from a die which includes a plurality of heating means on a circumferential edge of a die lip thereof to inflation mold a film;
    measuring a thickness of the film after molding in a direction perpendicular to the drawing out direction of the film by measuring a sampling film which is sampled by cutting the molded film and measuring the thickness of the sampling film in a direction perpendicular to the drawing out direction while establishing a corresponding relationship between the film thickness and measurement positions;
    establishing a corresponding relationship between measured film thickness data and said plurality of heating means while establishing a corresponding relationship between a particular position of said die lip and one of the measurement positions;
    calculating, based on the measured film thickness data individually corresponding to said heating means, electric control values for controlling heat to be individually generated by said heating means so that the measured film thickness data may be equal to each other; and
    controlling amounts of heat to be individually generated by said heating means in accordance with the electric control values individually calculated for said heating means.

2. A method according to claim 1 wherein, upon establishing a corresponding relationship between the measured film thickness data and said plurality of heating means, a characteristic portion which appears on the completed film in a corresponding relationship to a particular position of said die lip is detected, and a corresponding relationship between the measured film thickness data and said heating means is established with reference to said characteristic portion.

3. A method according to claim 1 wherein the electric control values for electrically controlling amounts of heat to be individually generated by said heating means correspond to deviation values of thicknesses of a one-sided material portion of the film from a thickness required for the complete film.

* * * * *